United States Patent
Ishii et al.

(10) Patent No.: US 6,473,481 B1
(45) Date of Patent: Oct. 29, 2002

(54) CONTROL ROD GUIDE TUBE CLEANING APPARATUS IN NUCLEAR REACTOR

(75) Inventors: Tsutomu Ishii, Hitachinaka; Tsumoru Miyahara, Tokai; Hideo Yonemura; Kiyoshi Izumi, both of Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/621,417

(22) Filed: Jul. 21, 2000

(30) Foreign Application Priority Data

Jul. 30, 1999 (JP) .......................................... 11-217833

(51) Int. Cl.$^7$ ............................. B21C 19/42; B21C 7/06
(52) U.S. Cl. ......................... 376/310; 376/353; 15/1.7; 15/104.05
(58) Field of Search ................................ 376/316, 230, 376/260, 310, 223, 236, 237, 242, 353; 15/1.7, 104.05

(56) References Cited

U.S. PATENT DOCUMENTS

| | | | |
|---|---|---|---|
| 3,780,571 A | * 12/1973 | Wiesener | |
| 3,852,153 A | * 12/1974 | Maslenok et al. | |
| 3,894,364 A | * 7/1975 | Korn et al. | |
| 4,048,010 A | * 9/1977 | Eschenfelder et al. | |
| 4,326,317 A | * 4/1982 | Smith et al. | |
| 4,424,531 A | * 1/1984 | Elter et al. | |
| 4,498,427 A | * 2/1985 | Todd | |
| 4,534,932 A | 8/1985 | Yoshikawa et al. | |
| 4,550,941 A | * 11/1985 | Veronesi et al. | 376/230 |
| 5,009,834 A | * 4/1991 | Tessaro | 376/232 |
| 5,030,410 A | * 7/1991 | Perry et al. | 376/310 |
| 5,217,677 A | * 6/1993 | Oosterkamp | 376/233 |
| 5,361,286 A | * 11/1994 | Monserud et al. | 376/316 |
| 5,378,064 A | * 1/1995 | Satoh et al. | 376/230 |
| 5,581,587 A | * 12/1996 | Satoh et al. | 376/230 |
| 5,604,532 A | * 2/1997 | Tillmanns | |
| 5,775,600 A | * 7/1998 | Wildeson et al. | |
| 5,818,892 A | * 10/1998 | Rauch et al. | 376/237 |
| 5,838,752 A | * 11/1998 | Shima mura | 376/260 |
| 6,018,557 A | 1/2000 | Matsumoto et al. | |
| 6,064,708 A | * 5/2000 | Sakamaki | 15/1.7 |
| 6,070,285 A | * 6/2000 | Geppert | 15/104.05 |

FOREIGN PATENT DOCUMENTS

| | | |
|---|---|---|
| JP | 58-15758 | 3/1983 |
| JP | 58-15759 | 3/1983 |
| JP | 59-224599 | 12/1984 |
| JP | 60-35640 | 8/1985 |
| JP | 61-99899 | 5/1986 |

* cited by examiner

Primary Examiner—Michael J. Carone
Assistant Examiner—Lulit Semunegus
(74) Attorney, Agent, or Firm—Mattingly, Stanger & Malur, P.C.

(57) ABSTRACT

The present invention is a control rod guide tube cleaning apparatus in a nuclear reactor which includes a rod member, one end side portion of which has a thickness such that the end side portion can pass through the inside of a connecting portion between a housing of a control rod drive mechanism and a control rod guide tube, a nozzle for sucking water, mounted on the rod member on the one end side so that the nozzle can go in and out of the rod member, a means for rotating the rod member in a horizontal direction, and a water passage for leading water sucked in the nozzle to an outside of the housing along the rod member. The rod member is inserted into the control rod guide tube through the inside of the housing. Then, the nozzle is rotated downward so that a suction port of the nozzle faces the bottom inside portion of the control rod guide tube for the suction of dust and debris. The nozzle is rotated in the horizontal direction by rotating the rod member in the horizontal direction.

9 Claims, 8 Drawing Sheets

CONTROL ROD GUIDE TUBE CLEANING APPARATUS IN NUCLEAR REACTOR

BACKGROUND OF THE INVENTION

The present invention relates to an apparatus for cleaning the inside of control rod guide tubes guiding control rods of a nuclear reactor.

Guide tubes each guiding a control rod of a nuclear reactor in a vertical direction are installed on the bottom of a nuclear reactor pressure vessel. Dust in the pressure container of a nuclear reactor penetrate into the control guide tubes, deposit on the bottom of the control rod guide tubes and are piled up.

As a cleaning operation of removing the dust that has accumulated on the bottom of the control rod guide tubes, there is a known cleaning method of penetrating a cleaning apparatus into the each of the control rod guide tubes from the upper portion of the pressure container of nuclear reactor and cleaning the bottom portions thereof inside the control rod guide tubes.

The cleaning method is disclosed in U.S. Pat. No. 5,030,410. In this method, an operation of opening a lid on an upper portion of the pressure container of nuclear reactor and an operation of taking out various apparatus and control rods inside the control rod guide tubes from the nuclear reactor pressure container are described. It is a matter of course that after the inside of the control rod guide tubes are cleaned, the prior condition of the nuclear reactor pressure container must be restored, so that reverse operations to the above operations become necessary.

Those operations are not simple or economical. Additionally, upon operation of cleaning the insides of control rod guide tubes, a sucking operation of sucking up dust in the control rod guide tubes upward against their weight is performed. The height from the upper portion of the nuclear reactor pressure container to the bottom of each of the control rod guide tubes is great, so that facilities provided for the sucking operation are large in scale and not economical.

An operation method of cleaning the insides of control rod guide tubes without each of the above-mentioned operations is disclosed in U.S. Pat. No. 4,534,932 and the corresponding JP A 59-224599 and explained as follows.

That is, a cleaning apparatus is inserted inside a housing of a control rod drive mechanism connected to each of the control rod guide tubes, and the upper portion of the cleaning apparatus is caused to reach the bottom in the control rod guide tube. An upper portion of the cleaning apparatus is provided with a brush or ultrasonic vibrator and a delivery port of washing water.

Debris that has accumulated on the bottom inside the control rod guide tubes is floated upward by rotating the brush or by ultrasonic waves emitted from the ultrasonic vibrator, and washed out by washing water delivered in the form of a jet from the delivery port. The washing water including the debris flows down inside the cleaning apparatus and is discharged out of the nuclear reactor pressure vessel. A method of separating debris from an inner surface of the control rod guide tube by a flush in this manner and washing out the debris out of the nuclear reactor pressure vessel also is disclosed in JP A 61-99899.

In those methods, since it is unnecessary to take out structures above the control rod guide tubes out of the nuclear reactor pressure vessel, the amount of work is reduced. However, in those methods, since debris is suspended inside the control rod guide tubes, it is possible that the suspended debris adheres once again to the control rods in the control rod guide tubes and the inner surfaces of control rod guide tubes.

A method of separating debris from the inner surfaces of control rod guide tubes by applying a high pressure water jet onto the inside of control rod guide tube instead of brushing by brush, and washing the debris out of the nuclear reactor pressure vessel is disclosed in JP B 58-15758, JP B 58-15759 and JP B60-35640.

In the method of such high pressure water jet onto the inside of control rod guide tube, it is possible to prevent the control rod guide tube inner surface from being damaged by friction between the brush and the control rod guide tube inner surface. However, even in such a method, debris may be suspended inside the control rod guide tube, so that it is possible that the suspended debris adheres once again to the control rods in the control rod guide tubes and the inner surfaces of control rod guide tubes.

Therefore, an object of the present invention is to make it possible to clean inner bottom portions of control rod guide tubes of a nuclear reactor without having to remove apparatuses inside the nuclear reactor pressure vessel as well as the control rods, and remove debris on the inner bottoms of the reactor control rod guide tubes without agitating the debris.

SUMMARY OF THE INVENTION

A first invention is a control rod guide tube cleaning apparatus in a nuclear reactor, which comprises a rod member, one end side portion of which has the thickness such that the end side portion can pass through an inside of a connecting portion between a housing of a control rod drive mechanism and a control rod guide tube, a nozzle for sucking water, mounted on the rod member on the one end side so that the nozzle can go in and out of the rod member, a means for rotating the rod member in a horizontal direction, and a water passage for leading water sucked in the nozzle to an outside of the housing along the rod member.

In the invention, the following operation is attained. That is, the rod member is inserted into the control rod guide tube through the inside of the housing, then the nozzle is caused to be out of the rod member to face the bottom inside the control rod guide tube. Next, dust piled up on the bottom inside the control rod guide tube is sucked together with water inside the control rod guide tube and discharged out of the housing through the water passage. Such a cleaning operation is performed so hat the dust piled up on the bottom inside the control rod guide tube is discharged out of the housing while changing a horizontal rotation position of the nozzle by rotating the rod member in the horizontal direction. According to such a cleaning operation, it is possible to suppress to agitate dust inside the control rod guide tube to suspend it, so that dispersion of the dust can be suppressed.

A second invention is the control rod guide tube cleaning apparatus, in which the water passage is formed by making the rod member hollow, in the above-mentioned first invention.

According to the second invention, the following operation is attained in addition to the first invention. That is, the water and dust sucked in the nozzle can be discharged out of the housing through the water passage formed inside the rod member, so that it is unnecessary to add a new construction for forming the water passage.

According to the third invention, the following operation can be obtained in addition to the second invention. That is, since the nozzle opening which is a suction port for sucking dust during the cleaning operation can be faced to the bottom inside the control rod guide tube, dust piled up on the bottom inside the control rod guide tube can be sucked efficiently in the nozzle opening.

A fourth invention is the control rod guide tube cleaning apparatus, in which the nozzle has a passage opening facing an inlet of the water passage under the condition that the nozzle is disposed outside the rod member, and the passage opening communicates with the nozzle opening, in the third invention.

According to the fourth invention, the following operation can be obtained in addition to the third invention. That is, when the nozzle is put out of the rod member, the water passage faces the passage opening of the nozzle whereby a portion from the nozzle opening to the water passage is automatically disposed under a condition of communication, and a course can be attained for leading the dust and water sucked in the nozzle out of the housing.

A fifth invention is the control rod guide tube cleaning apparatus, in which the rod member has a thickness such that the rod member can be inserted in the housing of a control rod drive mechanism, and is mounted on a member detachable to the housing of control rod drive mechanism, so as to be movable in the length direction of the housing and rotatable in a horizontal direction, in the fourth invention.

According to the fifth invention, the following operation can be obtained in addition to the fourth invention. That is, the member is arranged in the housing of the control rod drive mechanism, and the rod member can be mounted on the housing to be movable in the vertical direction and rotatable in the horizontal direction. Additionally, since the member guides the vertical movement and rotational movement of the rod member, the vertical movement and the rotation of the rod member can be smoothly effected.

A sixth invention is the control rod guide tube cleaning apparatus in which a suction pump arranged outside the housing is connected to the water passage, in the fifth invention.

According to the sixth invention, the following operation can be obtained in addition to the fifth invention. That is, the suction pump forcibly sucks dust into the nozzle, so that the cleaning operation can be performed faster than the suction of dust utilizing natural drop of water.

A seventh invention is the control rod guide tube cleaning apparatus in which a cylinder portion is formed inside the member detachable to the housing of control rod drive mechanism, a piston portion provided at an intermediate portion of the rod member is combined inside said cylinder portion so as to be movable in the length direction of the housing, and a hydraulic unit arranged outside the housing is connected to the cylinder portion so as to drive the piston portion by hydraulic pressure to move the piston portion in the length direction of the housing, in the sixth invention.

According to the seventh invention, the following operation can be obtained in addition to the sixth invention. That is, it is possible to move the rod member with hydraulic pressure by applying the hydraulic pressure generated in the hydraulic unit onto the piston portion. Therefore, even if the rod member becomes heavy, the cleaning operation can be easily achieved.

An eighth invention is the control rod guide tube cleaning apparatus in which a picture taking apparatus for taking, as an image, a cleaning portion and an illumination apparatus for illuminating the cleaning portion each are provided on one end side of the rod member, and a monitor for displaying an image taken by the picture taking apparatus is provided outside the housing, in the first invention.

According to the eighth invention, the following operation can be obtained in addition to the first invention. That is, a state of a portion to be cleaned is illustrated by the illumination apparatus and taken as an image by the picture taking apparatus and the image can be confirmed by the monitor.

A ninth invention is the control rod guide tube cleaning apparatus in which a picture taking apparatus and an illumination apparatus are provided on the one end side of the rod member so that the apparatuses can go in and out of the rod member, and a monitor for displaying an image taken by the picture taking apparatus and an operation apparatus for operating the picture taking apparatus and the illumination apparatus to cause the picture taking apparatus and the illumination apparatus to go in and out of said rod member are provided outside the housing, in the seventh invention.

According to the ninth invention, the following operation can be obtained in addition to the seventh. invention. That is, the picture taking apparatus and the illumination apparatus are caused to appear and disappear over the portion to be cleaned to illuminate the portion from the above by the illumination apparatus and take the portion as an image by the picture taking apparatus, and the image can be confirmed by the monitor.

A tenth invention is the control rod guide tube cleaning apparatus in a nuclear reactor which comprises a main body which is generally cylindrical and able to be inserted in a housing of a control rod drive mechanism provided on a lower side of a nuclear reactor pressure container, a rod member for pressing up a control rod, held by the main body so as to be movable in a vertical direction, a slit-shaped nozzle containing portion formed in the vicinity of a head portion of the rod member, and a suction nozzle supported by a shaft at one end so as to be rotatable between a vertical direction and a horizontal direction inside the nozzle containing portion.

According to the invention, the following operation can be obtained. That is, the main body is inserted in the housing, and the rod member is set the inside of the housing. After that, the rod member is moved upward and inserted in the control rod guide tube while pressing up the control rod. The nozzle is rotated to go out of the nozzle containing portion of the rod member inserted in the control rod guide tube. Dust piled up on the bottom inside the control rod guide tube and water can be sucked in the nozzle. Further, the dust piled up on the bottom inside the control rod guide tube and water can be sucked while changing a horizontal rotation position by rotating the rod member in the horizontal direction. According to such a cleaning operation, it is suppressed to agitate the dust inside the control rod guide tube to float it, so that dispersion of the dust can be suppressed.

An eleventh invention is the control rod guide tube cleaning apparatus in a nuclear reactor, which comprises a main body which is generally cylindrical and able to be inserted in a housing of control rod drive mechanism provided on a lower side of a nuclear reactor pressure container, a rod member for pressing up a control rod, held by the main body so as to be movable in a vertical direction, a slit-shaped nozzle containing portion formed in the vicinity of a head portion of the rod member, a suction nozzle supported by a shaft at one end so as to be rotatable between a vertical direction and a horizontal direction inside the nozzle containing portion, and an endoscope type television camera arranged in the nozzle containing portion.

According to the eleventh invention, the following operation can be attained. That is, the cleaning operation can be performed as in the tenth invention and further, it is possible to watch the cleaning portion by the endoscope type television camera.

DESCRIPTION OF PREFERRED EMBODIMENTS OF THE INVENTION

Figure 1:
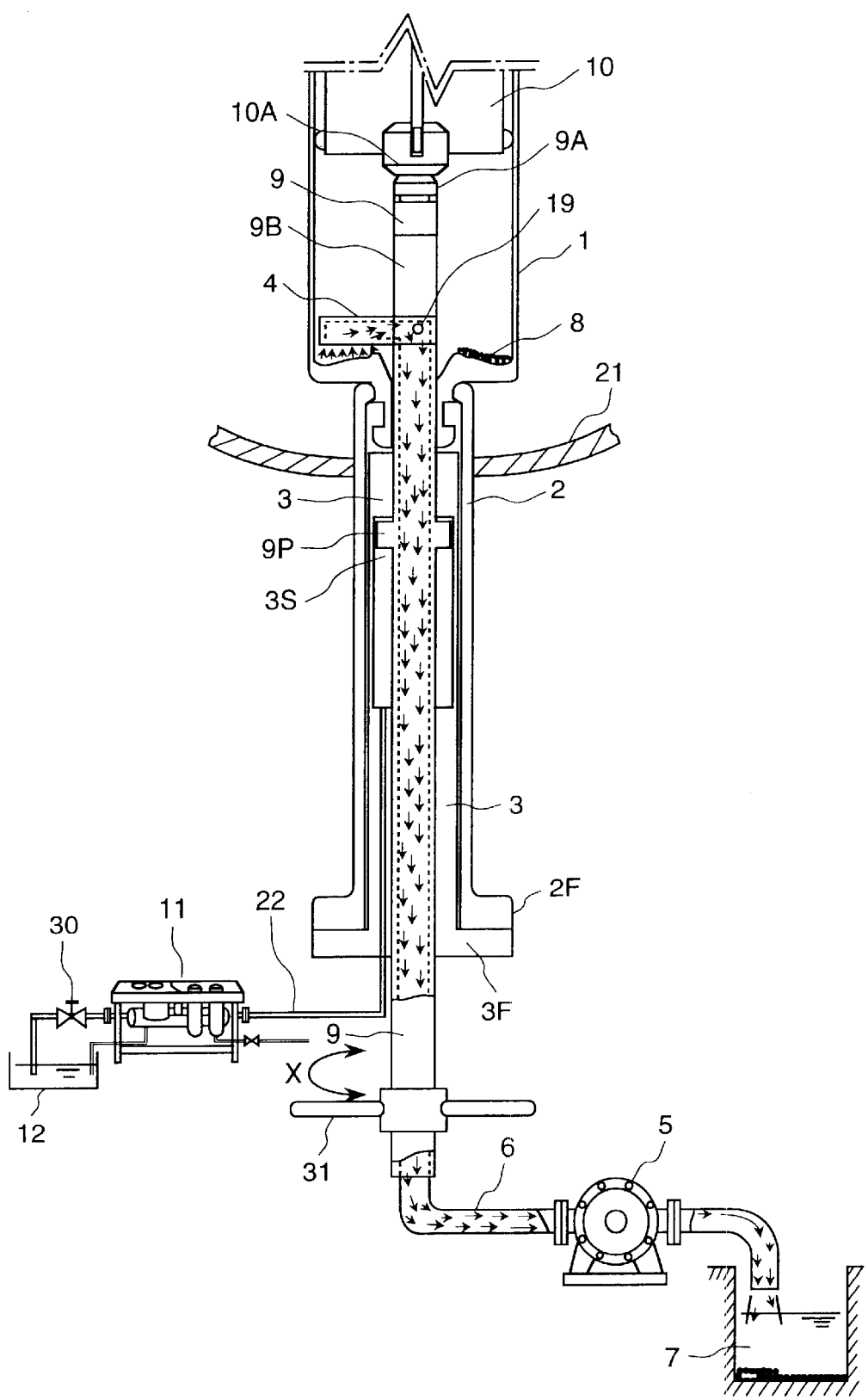
FIG. 1 is a partial sectional view for explanation of a first embodiment of a control rod guide tube cleaning apparatus according to the present invention.

As shown in FIG. 1, a housing 2 of a control rod drive mechanism is fixed to a nuclear reactor pressure vessel 21 of a boiling water type nuclear rector. The housing 2 is made cylindrical, and an upper end of the housing 2 is inside the nuclear reactor pressure vessel 21. A bayonet type connecting portion 3A provided in the upper end of the housing 2 is engaged with a bayonet type connecting portion 1B provided in a lower end of the control rod guide tube 1, whereby the housing 2 and a control rod guide tube 1 are connected to each other.

A control rod 10 is vertically movably in the control rod guide tube 1. During normal operation, the control rod 10 can be driven in the up and down direction by the control rod drive mechanism (not shown) inside the housing 2. A valve face 10A is provided at the lower end of the control rod 10. The valve face 10A closes the opening of the control rod guide tube 1 communicating with the housing 2 when the control rod 10 reaches the lower end of the control rod guide tube 1.

In the case of practicing a cleaning operation for removing dust 8 piled up on an inner bottom of the control rod guide tube 1, the control rod drive mechanism inside the housing 2 is taken out of the housing 2. Then, a part of a control rod guide tube cleaning apparatus is inserted in the housing 2 after the control rod drive mechanism has been removed.

FIG. 1 show a state in which the part of the control rod guide tube cleaning apparatus is inserted in the control rod guide tube 1 and a cleaning operation is performed.

A first embodiment of the control rod guide tube cleaning apparatus is constructed as follows.

A main body 3 of the control rod guide tube cleaning apparatus is made into a cylindrical shape which has such a diameter or thickness that the main body can be inserted in the housing 2. A flange 3F is provided at the lower end of the main body 3, and the flange 3F is detachably mounted on a flange 2F provided at the lower end of the housing 2.

A cylinder portion 3S which has a larger inner diameter than the other portion is provided in a part of the main body 3. A cylindrical rod member 9 is inserted in the main body 3 so as to be movable in the up and down direction. A piston portion 9P fixed to a half way of the rod member 9 is combined in the cylinder portion 3S so as to be movable in the up and down direction. The rod member 9 and the piston portion 9P are combined to the main body 3 so as to be horizontally rotatable.

A lower portion of the rod member 9 is protruded downward from the main body 3. A handle 31 is fixed to the protruded portion of the rod portion 9. An inside of the rod member 9 is made hollow from a portion having a nozzle 4 to an lower end of the rod member 9, a water passage 20 is formed therein. A flexible tube 6 is connected between an lower end of the water passage 20 and a suction port of a suction pump 5. A pipe line is connected to a delivery port of the suction pump in order to discharge water into a pit 7 for receiving drain in the nuclear reactor container.

A pipe line 22 is provided at the bottom of the cylinder portion 3S so that one end of the pipe line 22 communicates with the inside of the cylinder portion 3S. The pipe line 22 passes through the inside of the main body 3 and the other end of the pipe line 22 runs downward from the main body 3. The above-mentioned other end of the pipe line 22 is connected to a hydraulic unit 11. A drain valve 30 is provided midway through a drain pipe from the hydraulic unit 11 to a container 12 for water collection. Drain water can be flowed into or stopped to flow in the container 12 for water collection by operation of opening/closing of the drain valve 30.

When the hydraulic unit 11 is driven under the condition that the drain valve 30 is closed, the hydraulic unit 11 can supply water pressure into the cylinder portion 3S through the pipe line 22. Since the hydraulic pressure can raise the piston portion 9P inside the cylinder portion 3S, the rod member 9 can move upward relative to the main body 3. Further, by opening the drain valve 30, water and hydraulic pressure in the hydraulic unit 11 and the cylinder portion 3S are flowed in the side of the container 12, and the piston portion 9P can move downward by the weight of the rod member 3.

On the portion of the rod member 9 that can protrude upward from the main body 3, a nozzle 4, a nozzle containing portion 9B and a head portion 9B are mounted. The portion of rod member 9 that can protrude upward from the main body 3 has a cylindrical shape, the diameter or thickness of which is such that the portion can pass through the inside of the connection of the control rod guide tube 1 to the housing 2. On the upper end of the rod member 9, the head portion 9A made solid is fixed.

An inside of the rod member 9 adjacent to a portion immediately under the head portion 9A is hollowed out in a slit-like shape to form the nozzle containing portion 9B for containing the nozzle 4. The nozzle 4 is mounted on the rod member 9 by a shaft 19 so as to be rotatable in a vertical plane, and installed inside the nozzle containing portion 9B. The nozzle 4 has not any portion projecting out of the rod member 9 from the inside under the condition that the nozzle 4 is made generally upright by rotating it so as to direct its tip upward. The shaft 19 which is a rotation center of the nozzle 4 is mounted eccentrically on the nozzle 4 so that the nozzle 4 can rotate by its weight to have a generally horizontal position. That is, the shaft 19 is arranged so that when the nozzle 4 stands upright as shown by a dotted line in FIG. 4, the position of the pin 19 is a little separated horizontally from a vertical line passing the center of weight of the nozzle 4 toward a right side in FIG. 4, whereby the nozzle 4 can be rotated by its weight so that the nozzle opening 4N is opened downward.

The shaft 19 is positioned so that under the condition the nozzle 4 is disposed generally horizontal, the passage opening 4B and the nozzle opening 4N are opened downward and the passage opening 4B faces an upper end inlet of the water passage 20.

The passage opening 4B and the nozzle opening 4N are communicated through an inner passage 4A. The e nozzle 4 is made so that the passage opening 4B and the nozzle opening 4N each are opened and the other portion is closed. Corner portions existing in a downward rotation direction of the nozzle 4 are rounded in an arc-like shape, whereby damage due to contact with surrounding members is suppressed.

A second embodiment of a control rod guide tube cleaning apparatus of the present invention is constructed as follows. The second embodiment has a new construction added to the first embodiment. The added construction will be explained hereunder.

Figure 7:
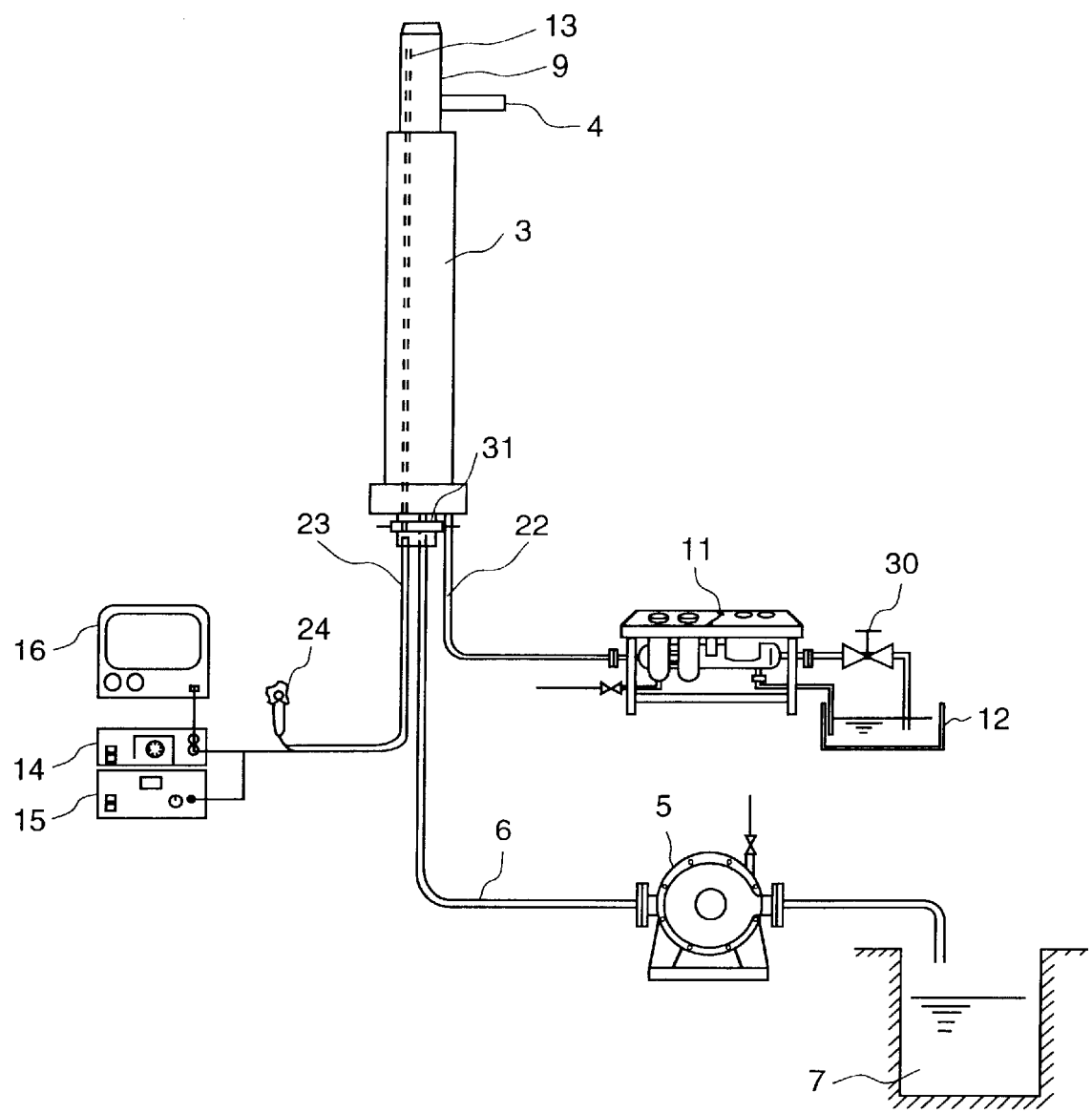
FIG. 7 is a schematic diagram of an entire control rod guide tube cleaning apparatus of a second embodiment of the present invention.
Figure 8:
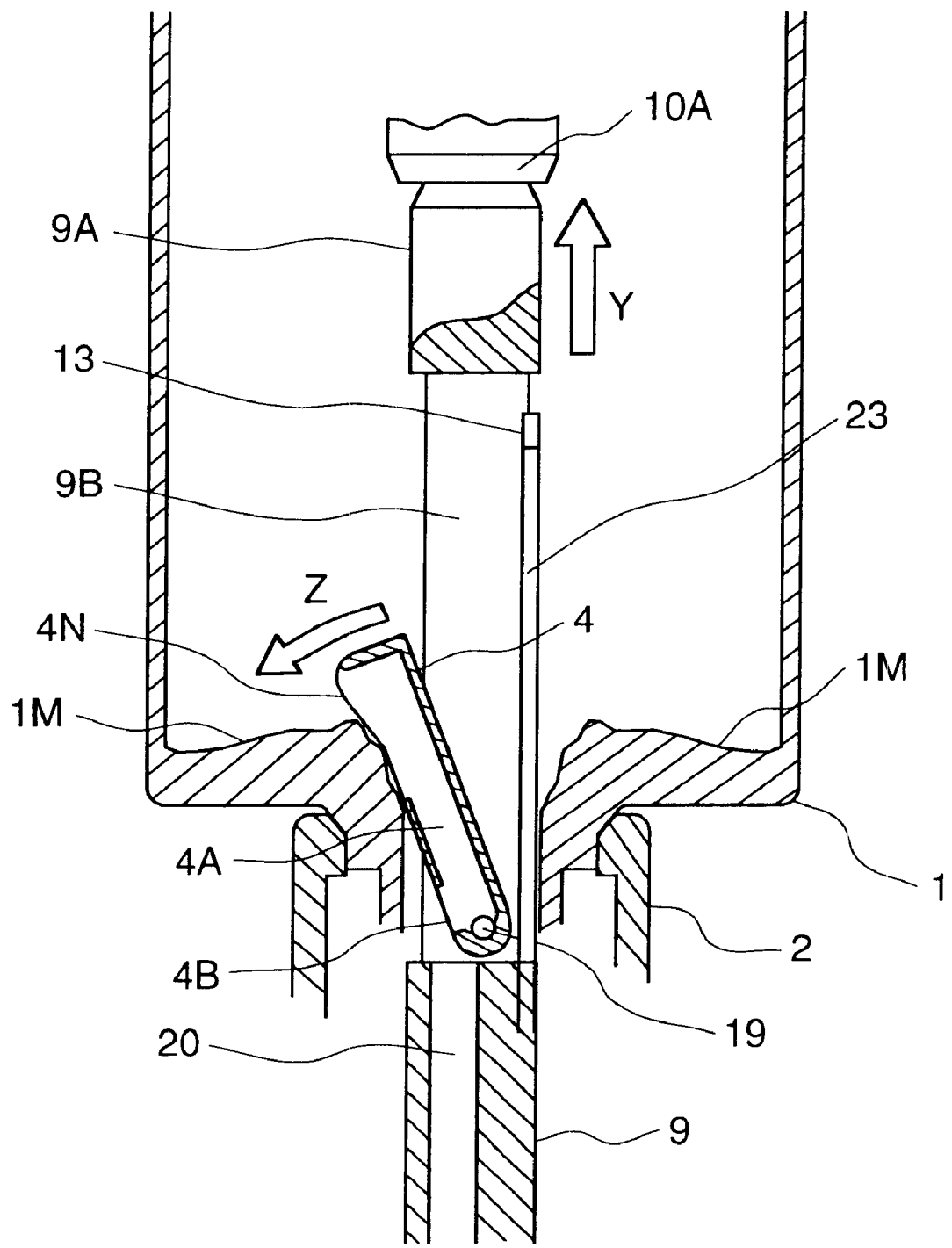
FIG. 8 is a sectional view showing a process in which a rod member in FIG. 7 is being inserted in a control rod guide tube.
Figure 9:
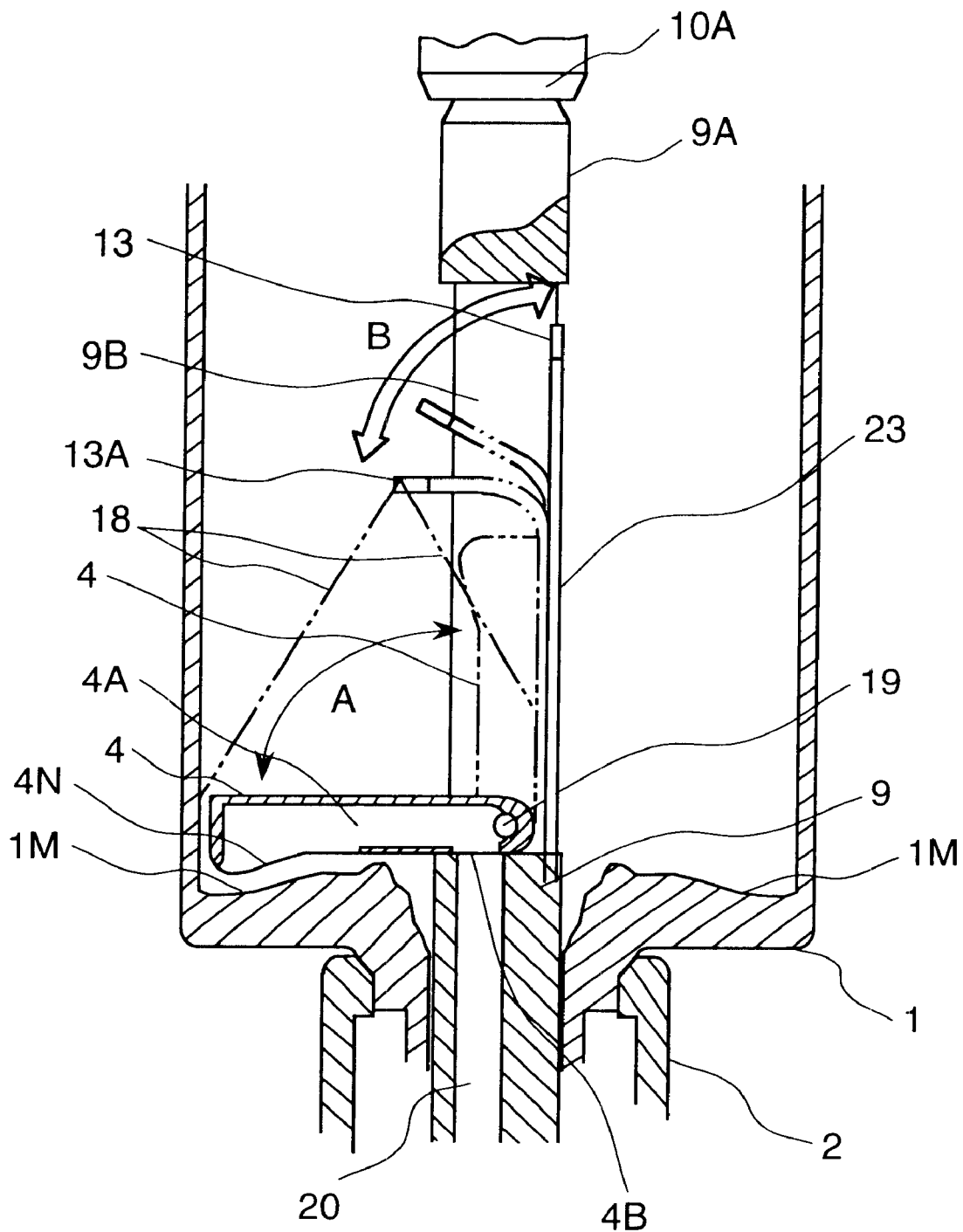
FIG. 9 is a sectional view showing the state that the rod member in FIG. 7 has been inserted in the control rod guide tube and become horizontal.

That is, in the second embodiment, as a shown in FIGS. 7, 8 and 9, a television camera 13 is mounted inside the nozzle containing portion 9B of the rod member 4, and a cleaning state can be observed by images.

As the television camera 13, a camera of endoscope type wherein a small-sized CCD camera provided at an end and an illumination apparatus for light guide using optical fiber are combined is employed. The whole thereof such as the small-sized CCD camera, its signal line, optical fiber, etc. is formed in fine tubular shape as a body cable 23. The body cable 23 passes through the inside of the rod member 9 and is led out of the main body 3.

The television camera 13 and light guide is made so as to be swingable any angles in a direction indicated by an arrow B in FIG. 9 by remote control. Thereby, the television camera 13 and the light guide are moved to any places from a position at which they are contained inside the nozzle containing portion 9B to a position at which a prescribed range of the bottom 1M of the control rod guide tube 1 including the nozzle 4 can be within a field 18 of shooting view.

Therefore, a remote-controlling operation wire for swinging the camera, in addition to the CCD camera signal line and the optical fiber for light guide are contained in the body cable 23, and the body cable 23 passes through the inside of the rod member 9 and is led out from the lower side.

The body cable 23 of FIG. 7 is led out through the inside of the rod member 9, and midway, the CCD camera signal line is connected to a camera control unit 14 and the optical fiber for light guide is connected to a camera light source unit 15. The remote-controlling operation wire for swinging the camera in the body cable 23 is connected to a camera swinging operation part 24. A monitor unit 16 is connected to the camera control unit 14. The monitor unit 16 receives an image signal of the CCD camera through the signal line and the camera control unit 14 and has a function of displaying images taken by the CCD camera. Further, the camera light source unit 15 can input light into an one end of the optical fiber. Therefore, the light is guided toward the other end of the optical fiber by the optical fiber, and irradiated therefrom into the outside. The above-mentioned other end of the optical fiber is provided on an end of the body cable 23 on the side of the nozzle containing portion 9B so that the irradiation direction of the light is the same as the direction of the CCD camera.

As shown in FIG. 9, after the rod member 9 has been inserted in the control rod guide tube 1, the camera swinging operation part is operated to move the television camera 13 to a position 13A shown in FIG. 9. Thereby, the nozzle 4 is moved so as to come into the field 18 of shooting view of the camera, whereby the prescribed range of the bottom of the control rod guide tube 1 including the nozzle 4 is illuminated by light from the optical fiber, an illuminated portion is taken by the CCD camera as, an image and the image is displayed on a display of the monitor unit 16.

Next, a cleaning-operation using the cleaning apparatus of the first embodiment will be explained hereunder.

First of all, using an exchanging apparatus of the control rod drive mechanism, the control rod drive mechanism is withdrawn from the housing 2 of the control rod drive mechanism. Then, the main body 3 is inserted in the housing by using the exchanging apparatus of the control rod drive mechanism.

Figure 2:
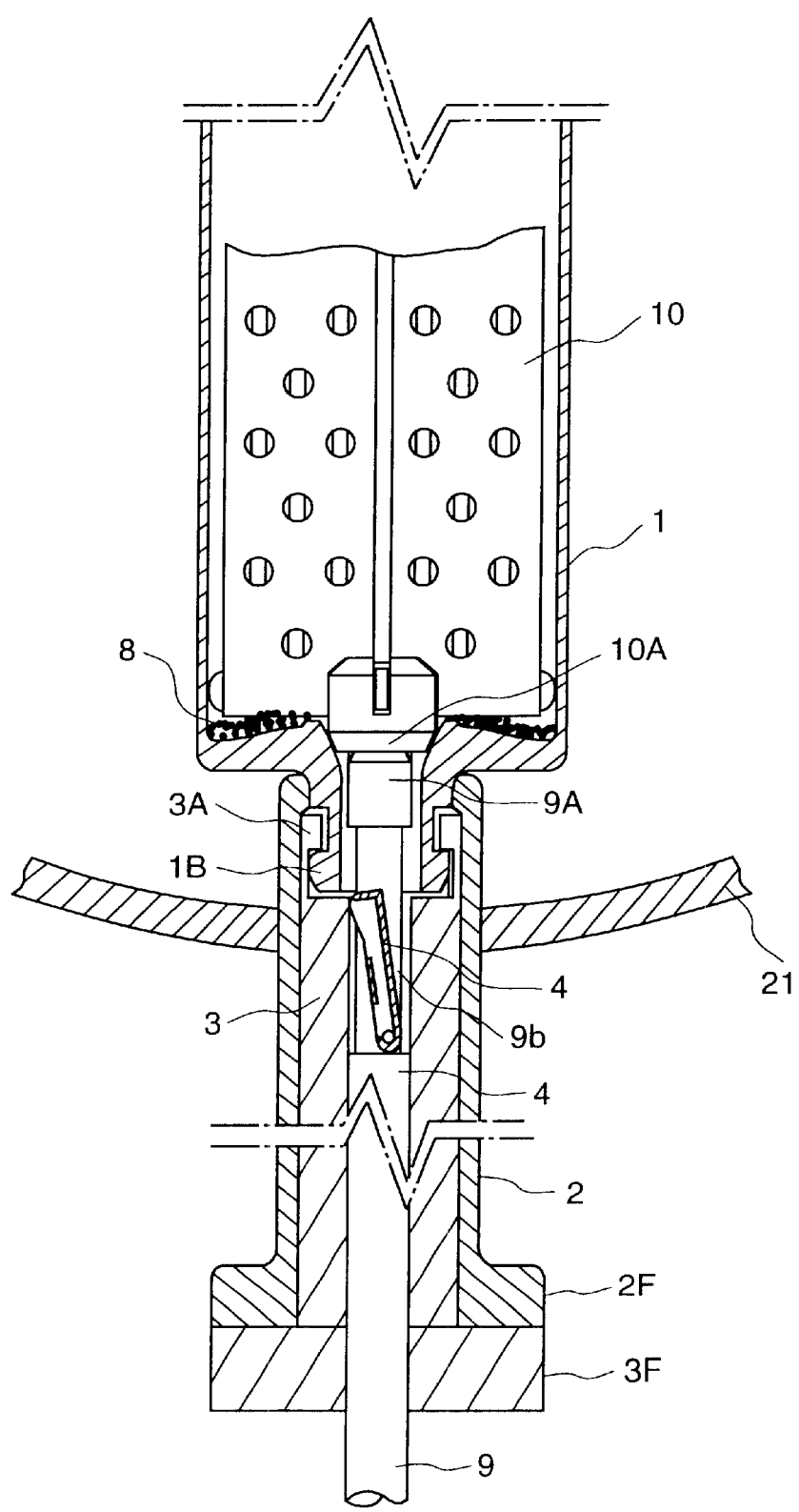
FIG. 2 is a sectional view showing the state immediately before a head portion of a rod member shown in FIG. 1 presses up a valve face of a control rod.

When the main body 3 is inserted in the housing 2, the piston portion 9P is positioned at the lowest end portion inside the cylinder portion 3S to make the nozzle 4 received by the inner surface of the main body 3S shown in FIG. 2. After the main body 3 is inserted in the housing 2, the flange 3F of the main body 3 is fixed to the flange 2F of the housing 2 by bolts. Under this condition, the head portion 9A of the rod member 9 is adjacent to the valve face 10A of the control rod 10.

Next, by driving the hydraulic unit 11 to supply hydraulic pressure into the cylinder portion 3S, the piston portion 9P is pressed up by the hydraulic pressure. Therefore, the rod member 9 also is moved upward while pressing up the valve face 10A by the head portion 10A. When the rod member 9 starts to move upward, the nozzle 4 also moves upward. In this case, the upper portion of the nozzle 4 moves upward while contacting with and sliding on the inner surface of the main body 3 and the inner surface of the connecting portion 1B.

Figure 3:
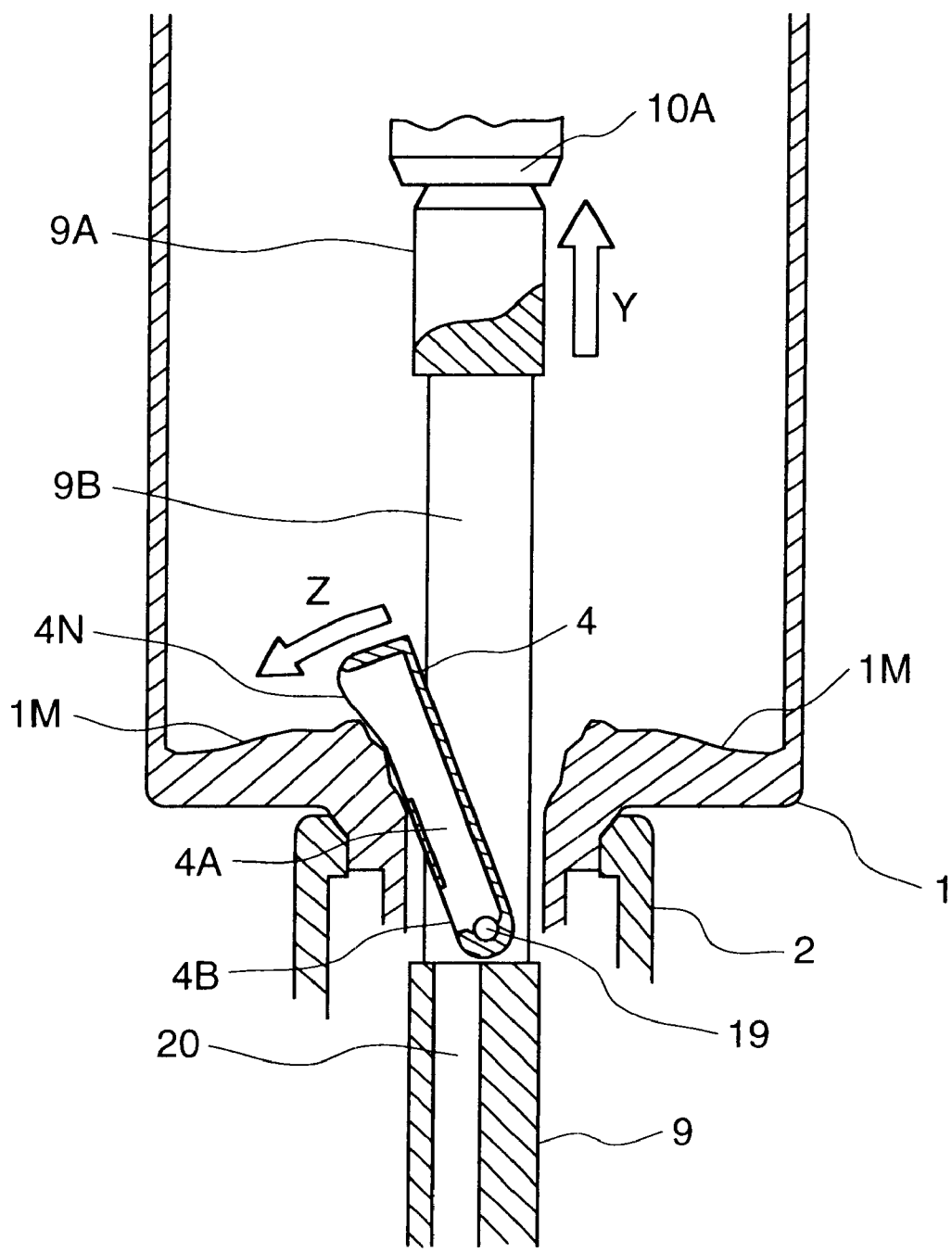
FIG. 3 is a sectional view showing a process in which the rod member in FIG. 1 is being inserted in the control rod guide tube.
Figure 4:
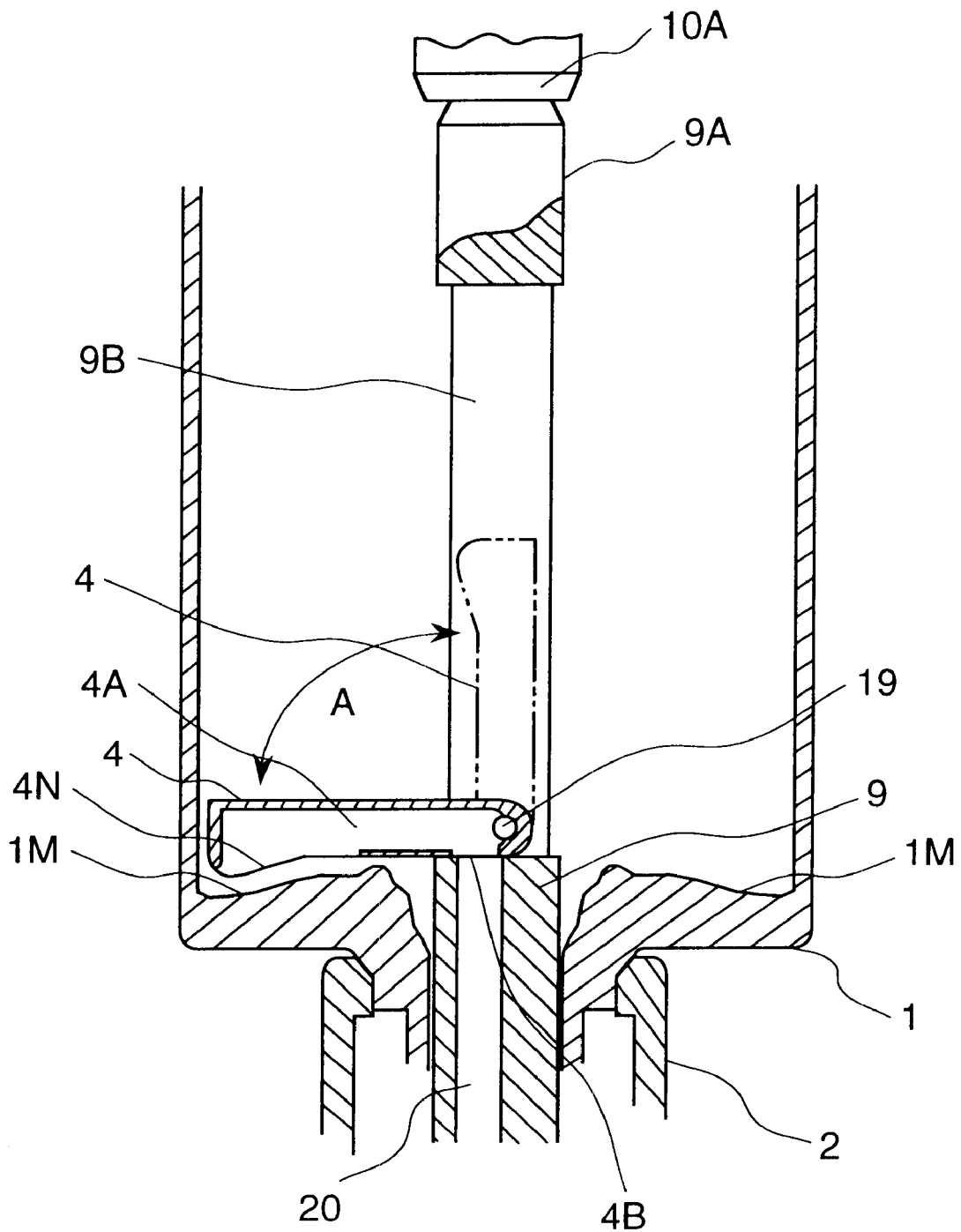
FIG. 4 is a sectional view showing the state that the rod member in FIG. 1 has been inserted in the control rod guide tube and become horizontal.

Further, by continuing the upward movement of the rod member 9 as shown by an arrow Y, the nozzle 4 rotates in a direction shown by an arrow 2 in FIG. 3, and finally becomes horizontal as shown in FIG. 4. Since the piston portion 9P has reached the upper end of the cylinder portion 3S under the condition of the nozzle 4 being turned horizontal, the condition of the piston portion 9P is maintained by continuing to drive the hydraulic unit 11 to prevent the down movement of the piston portion 3S. Under this condition, the nozzle opening 4N of the nozzle 4 faces the bottom surface inside the control rod guide tube 1, and similarly to this, the passage opening 4B of the nozzle 4 faces the inlet of the upper end of the water passage 20.

Figure 5:
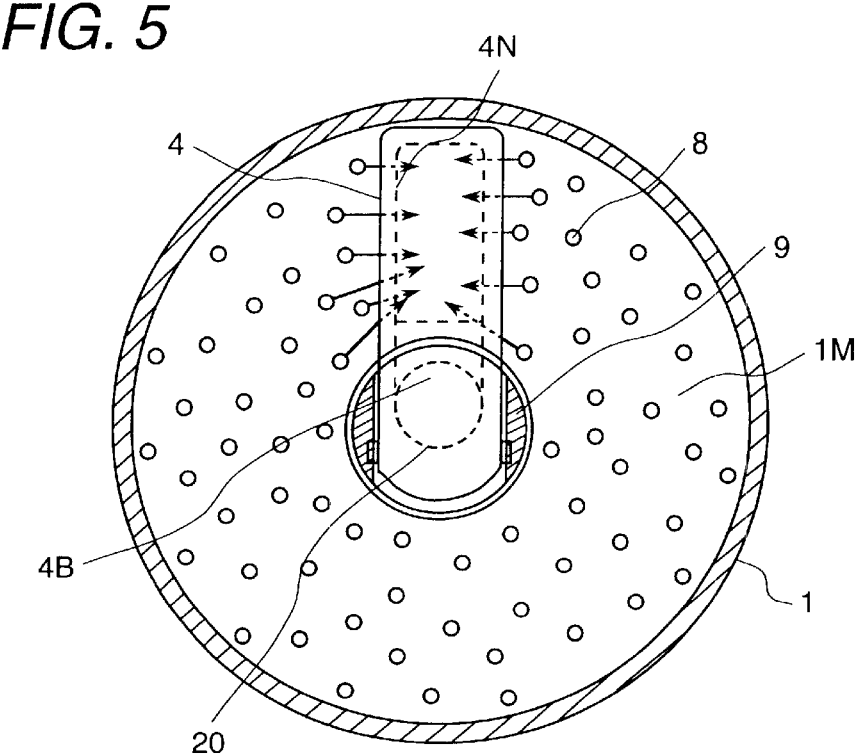
FIG. 5 is a plan view of a portion in the vicinity of the control rod guide tube cleaning apparatus, viewed from the above.

Next, the nozzle 4 is caused to suck water on the bottom of the control rod guide tube 1 by driving the suction pump 5 shown in FIG. 1. When the suction is started, dust 8 under the nozzle 4 and in the vicinity thereof are sucked in the nozzle opening 4N as shown in FIG. 5. The dust 8 sucked in the nozzle opening 4N enters the water passage 20 together with water through the passage 4A inside the nozzle 4 and the passage opening 4B of the nozzle 4. The water and dust 8 entered the water passage 20 flows downs in the water passage 20 along the rod member 9, reaches the suction pump 5 through the flexible tube 6, and drains from the suction pump 5 into the pit 7. The nozzle opening 4N is opened only downward and the nozzle 4 does not have any other opening, so that it is possible to efficiently suck dust 8 through the nozzle 4 without sucking excessive water.

Figure 6:
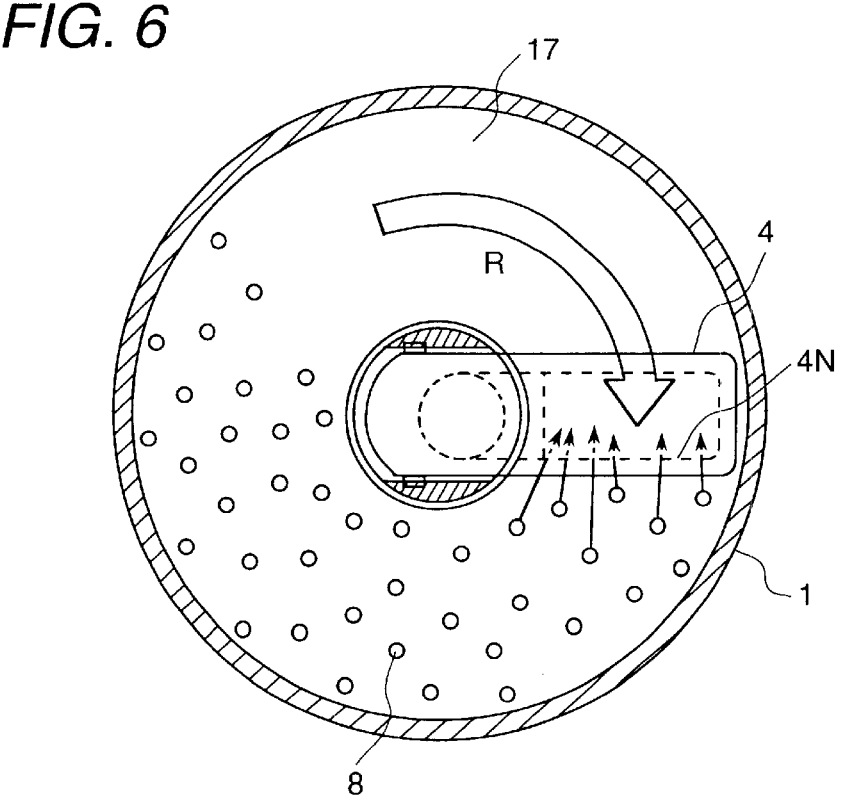
FIG. 6 is a plan view in which a horizontal rotating condition of a nozzle of the control rod guide tube cleaning apparatus according to the present invention is viewed from the above.

A handle 31 shown in FIG. 1 is rotated horizontally about the rod member 9 as shown by an arrow X while driving the suction pump 5. By rotating the handle 31 in this manner, the rod member 9 is rotated and the nozzle 4 also is rotated horizontally. For example, when the nozzle 4 is rotated in a horizontal R direction as shown by an arrow R in FIG. 6, it is possible to suck dust existing in the R direction together with water and discharge them into the pit 7.

In this manner, the cleaning operation of discharging the dust 8 piled up on the bottom in the control rod guide tube 1 is performed. In such a cleaning operation, since dust 8 piled up on the bottom inside the control rod guide tube 1 is not agitated and floated, it is possible to suppress piling up again of floated dust 8 and re-adhesion of it on the control rod 10. In the case of cleaning finely, the cleaning is performed by rotating reversibly the handle 31.

After the finish of cleaning the inside of the control rod guide tubes 1, first, the suction pump 5 and the hydraulic unit 11 are stopped to drive, then, the drain valve 30 is opened whereby water inside the cylinder portion 3S is discharged into the water collection container 12, and the pressure inside the cylinder portion 3S becomes the same as atmospheric pressure. Thereby, the piston portion 9P descends by the weight of the rod member 9, etc., so that the rod member 9 also descends.

By the descent of the rod member 9, the nozzle also descends, whereby the nozzle 4 is changed of its pose from the horizontal state shown in FIG. 4 to an inclined state shown in FIG. 3, and finally contained inside the nozzle containing portion 9B. In this case, a part of the rotation end of the nozzle 4 contacts with and slides on the inner surface of the connecting portion 1B and the inner surface of the main body 3, however, since the contacting portions of the nozzle 4 are rounded, damage caused by the contact of them can be suppressed. In this manner, when the rod member 9 is returned to the state as shown in FIG. 2, the valve face 10A of the control rod 10 closes the opening of the connection portion 1B.

After that, by releasing the connection between the flange 3F of the main body 3 and the flange 2F of the housing 2, the main body 3 is pulled out by using the exchanging apparatus of the control rod drive mechanism. Then the control rod drive mechanism is inserted in the housing 2 and installed by using the exchanging apparatus of the control rod drive mechanism.

A cleaning operation using the cleaning apparatus of the second embodiment is performed as follows.

First of all, the rod member 9 is lowered by opening the drain valve 30 so that the nozzle 4 is contained inside the main body 3, then the drain valve 30 is closed. Further, the body cable 23 inside the nozzle containing portion 9B is maintained upright by using the camera swinging operation portion 24.

Next, in a similar manner to the explanation of the first embodiment already described above, the main body 3 is inserted in and fixed to the housing 2 after the control rod drive mechanism has been withdrawn. Next, in a similar manner to the explanation of the first embodiment, the piston portion 9P is moved upward by the hydraulic pressure generated by the hydraulic unit 11. As the piston portion 9P rises, the rod member 9 moves upward while pressing up the valve face 10A of the control rod 10. Since the nozzle 4 moves upward also according to the upward movement of the rod member 9, the nozzle 4 moves upward while rotating from a state of FIG. 8 to a state of FIG. 9.

As shown in FIG. 9, after the nozzle 4 has been horizontal, the body cable 23 of the television camera 13 inside the nozzle containing portion 9B is bent midway and protruded in the same horizontal direction as in the direction nozzle 4 by using the camera swinging operation portion 24. Under this condition, the handle 31 is rotated horizontally to rotate the nozzle 4 in the horizontal direction while driving the suction pump 5. Thereby, it is possible to suck dust piled up on the bottom inside the control rod guide tube 1 into the nozzle opening 4N together with water inside the control rod guide tube 1. In this manner, the dust 8 and water sucked in the nozzle 4 are discharged into the pit 7 in the same manner as in the first embodiment.

The camera swinging operation portion 24 is operated to move the television camera 13 to a camera position 13A indicated in FIG. 9 so that the nozzle 4 comes in a field 18 of camera shooting view.

Thereby, a prescribed range of the bottom inside the control rod guide tube 1 including the nozzle 4 is illuminated by the light transmitted while being guided by the optical fiber, the prescribed range is taken as an image by the CCD camera, and the contents of image are displayed on the display of the monitor unit 16.

Therefore, according to the present embodiment, a state of the bottom inside the control rod guide tube 1 can be observed in real time in any time including the cleaning operation time. An operation of removing dust 8 by the nozzle 4 can be suitably performed by the observation. Since the cleaning operation can be processed while confirming whether or not dust 8 is being surely removed by observing the contents displayed on the display of the monitor unit 16, the cleaning operation can be always surely performed.

After the finish of cleaning the inside of the control rod guide tube 1, the camera swinging operation portion 24 is operated to make the body cable 23 of the television camera straightly upright and contained in the nozzle containing portion 9B as shown in FIG. 8. Then, in the same manner as in the first embodiment, the rod member 9 is lowered, the main body 3 is pulled out of the housing 2 and then the control rod drive mechanism is inserted and installed in the housing 2.

The body cable 23 of the television camera 13 is kept extended straightly in the vertical direction and contained inside the nozzle containing portion 9B as shown in FIG. 8, at any time other than when the rod member 9 is contained in the control rod guide tube 1.

If the television camera 13 and illumination apparatus are installed at a position of being not a bar to movement of the nozzle 4 inside the nozzle containing portion 9B so as to face the bottom inside the control rod guide tube 1, the camera swinging operation portion 24 is not necessary.

According to the first and second embodiments of the present invention, it is possible to easily perform a cleaning operation of the bottom inside the control rod guide tube 1 from the lower side of the nuclear reactor pressure container 21, and to remove dust 8 piled up on the bottom with almost no agitating it. Therefore, it is possible to remove easily and surely dust 8 on the bottom inside the control rod guide tube 1.

As a result, it becomes to remove dust inside the control rod guide tube 1 in a short cycle, whereby it is possible to easily prevent the dust 8 inside the control rod guide tube 1 from entering the other apparatuses and becoming a factor of making them into radiation sources.

According to the first and second embodiments of the present invention, by employing the main body 3 which is able to be fixed to the housing 2, the cylinder portion 3S provided in the main body 3, the piston portion 9P embedded in the cylinder portion 3S and the hydraulic unit for applying hydraulic pressure onto the piston portion 9P, the rod member 3 is made possible to be moved up and down by hydraulic pressure, being guided by the main body 3. However, the rod member 9 can be moved up and down by human power or other known methods without employing such members.

According to the first and second embodiments of the present invention, dust and water are forcibly sucked into the nozzle 4 by the suction pump 5, however, it is possible to suck the dust and water into the nozzle 4 by a water head between the pit 7 and the bottom of the control rod guide tube 1, without using the suction pump 5, and to discharge the dust and water into the pit 7.

What is claimed is:

1. A control rod guide tube cleaning apparatus in a nuclear reactor comprising:

a rod member, one end side portion of which has such a thickness that the end portion can pass through an inside of a connecting portion between a housing of a control rod drive mechanism and a control rod guide tube;

a suction nozzle for sucking water, movably mounted on said rod member on the one end side so as to be able to enter and go out said rod member;

a means for rotating said rod member in a horizontal direction; and a water passage for leading water sucked in said nozzle to an outside of said housing along said rod member.

2. A control rod guide tube cleaning apparatus according to claim 1, wherein said water passage is formed by making said rod member hollow.

3. A control rod guide tube cleaning apparatus according to claim 2, wherein said nozzle has a nozzle opening opened downward under the condition that said nozzle is disposed outside said rod member.

4. A control rod guide tube cleaning apparatus according to claim 3, wherein said nozzle has a passage opening facing an inlet of said water passage under the condition that said nozzle is disposed outside said rod member, and said passage opening communicates with said nozzle opening.

5. A control rod guide tube cleaning apparatus according to claim 4, wherein said rod member has a thickness such that said rod member can be inserted in said housing of a control rod drive mechanism, and is mounted on a member detachable to said housing of control rod drive mechanism, so as to be movable in the length direction of said housing and rotatable in a horizontal direction.

6. A control rod guide tube cleaning apparatus according to claim 5, wherein a suction pump arranged outside said housing is connected to said water passage.

7. A control rod guide tube cleaning apparatus according to claim 6, wherein a cylinder portion is formed inside said member detachable to said housing of a control rod drive mechanism, a piston portion provided at an intermediate portion of said rod member is combined inside said cylinder portion so as to be movable in the length direction of said housing, and a hydraulic unit arranged outside said housing is connected to said cylinder portion so as to drive said piston portion by hydraulic pressure to move said piston portion in the length direction of said housing.

8. A control rod guide tube cleaning apparatus in a nuclear reactor comprising:

a main body which is generally cylindrical and able to be inserted in a housing of control rod drive mechanism provided on a lower side of a nuclear reactor pressure container;

a rod member for pressing up a control rod, held by said main body so as to be movable in a vertical direction;

a slit-shaped nozzle containing portion formed in the vicinity of a head portion of said rod member; and a suction nozzle supported by a shaft at one end so as to be rotatable between a vertical direction and a horizontal direction inside said nozzle containing portion, said suction nozzle having a nozzle opening and passage opening, said nozzle opening facing the bottom of said control rod guide tube and said passage opening communicating with a water passage formed in said rod member when said suction nozzle is generally horizontal.

9. A control rod guide tube cleaning apparatus for a nuclear reactor having a housing of a control rod drive mechanism secured to a pressure vessel at an upper end portion thereof and a control rod guide tube disposed in said pressure vessel and having a lower end portion connected to an upper end of said control rod guide tube to provide a connecting portion, said housing and said lower portion of said control rod guide tube having an inner through hole, said control rod guide tube cleaning apparatus comprising:

a rod member having inside a water passage and disposed in said inner through hole so as to be axially movable so that one end of said rod member is shiftable from a position at or below a bottom of said control rod guide tube into the inside of said control rod guide tube through said connecting portion;

a suction nozzle having a nozzle opening and a passage opening, and rotatably mounted on an upper portion of said rod member at one end thereof, said suction nozzle being disposed so that said nozzle opening and passage opening are inside said inner through hole under the condition that said upper portion of said rod member is disposed at or below the bottom of said control rod guide tube, and said nozzle opening faces the bottom of said control rod guide tube and said passage portion faces an upper end of said water passage of said rod member under condition that said one end of said nozzle rod member is disposed inside said control rod guide tube;

a suction pump fluidly connected to said water passage of said rod member; and a rotating device fixed to said rod member so as to rotate said suction nozzle.

\* \* \* \* \*